US010675563B2

(12) United States Patent
Chen et al.

(10) Patent No.: US 10,675,563 B2
(45) Date of Patent: Jun. 9, 2020

(54) FILTER ELEMENT AND FILTER DEVICE

(71) Applicants: FOSHAN VIOMI ELECTRICAL TECHNOLOGY CO., LTD., Foshan (CN); XIAOMI, INC., Haidian District, Beijing (CN); Xiaoping Chen, Foshan (CN)

(72) Inventors: Xiaoping Chen, Foshan (CN); Xinyu Liu, Beijing (CN)

(73) Assignees: Foshan Viomi Electrical Technology Co., Ltd., Foshan (CN); Xiaomi Inc., Beijing (CN); Xiaoping CHEN, Foshan (CN)

( * ) Notice: Subject to any disclaimer, the term of this patent is extended or adjusted under 35 U.S.C. 154(b) by 412 days.

(21) Appl. No.: 15/611,321

(22) Filed: Jun. 1, 2017

(65) Prior Publication Data

US 2017/0266589 A1    Sep. 21, 2017

Related U.S. Application Data

(63) Continuation of application No. PCT/CN2015/096259, filed on Dec. 3, 2015.

(30) Foreign Application Priority Data

Dec. 3, 2014  (CN) .......................... 2014 1 0729479

(51) Int. Cl.
*B01D 35/153* (2006.01)
*B01D 24/10* (2006.01)
(Continued)

(52) U.S. Cl.
CPC ............. *B01D 24/10* (2013.01); *B01D 35/30* (2013.01); *C02F 1/283* (2013.01); *B01D 24/167* (2013.01);
(Continued)

(58) Field of Classification Search
CPC ........................... B01D 35/153; B01D 35/157
(Continued)

(56) References Cited

U.S. PATENT DOCUMENTS

| 5,045,192 | A | 9/1991 | Terhune |
| 7,459,078 | B2 * | 12/2008 | Klein ..................... B01D 29/96 |
| | | | 210/234 |
| 2002/0033365 | A1 | 3/2002 | Patil |

FOREIGN PATENT DOCUMENTS

| CA | 2457123 A1 | 3/2003 |
| CN | 202366539 U | 8/2012 |

(Continued)

OTHER PUBLICATIONS

Office Action issued in corresponding Chinese Application No. 201410729479.2, dated May 17, 2016, 5 pages.
(Continued)

*Primary Examiner* — Thomas M Lithgow
(74) *Attorney, Agent, or Firm* — Arch & Lake LLP

(57) ABSTRACT

Disclosed are a filter element and a filter device using the filter element. The filter element includes: a base, wherein the base is installed on the filter device, and a first passage and a second passage are disposed at least partially in the base; and a filter body, wherein the filter body is detachably connected to an upper part of the base, the filter body has a filter space therein, a first filter passage and a second filter passage are connected and arranged on the two ends of the filter space, and a filter material for filtration is provided in the filter space. When the filter element is in a working state, the first filter passage and the first passage are connected for fluid communication, and the second filter passage and the second passage are connected for fluid communication.

20 Claims, 8 Drawing Sheets

(51) Int. Cl.
  *B01D 35/30*   (2006.01)
  *C02F 1/28*    (2006.01)
  *B01D 24/16*   (2006.01)

(52) U.S. Cl.
  CPC ........ *B01D 35/153* (2013.01); *B01D 2101/02* (2013.01); *B01D 2201/302* (2013.01); *B01D 2201/303* (2013.01); *B01D 2201/304* (2013.01); *C02F 2201/004* (2013.01); *C02F 2201/006* (2013.01)

(58) Field of Classification Search
  USPC .................................................. 210/234–235
  See application file for complete search history.

(56) References Cited

FOREIGN PATENT DOCUMENTS

| | | |
|---|---|---|
| CN | 202538455 U | 11/2012 |
| CN | 202682887 U | 1/2013 |
| CN | 203874557 U | 10/2014 |
| CN | 203899259 U | 10/2014 |
| CN | 204447434 U | 7/2015 |
| CN | 204447435 U | 7/2015 |
| CN | 204447436 U | 7/2015 |
| CN | 204447437 U | 7/2015 |
| CN | 204447438 U | 7/2015 |
| CN | 204485401 U | 7/2015 |
| CN | 204485453 U | 7/2015 |
| CN | 104941268 A | 9/2015 |
| CN | 104941293 A | 9/2015 |
| KR | 1020010010912 A | 2/2001 |
| KR | 100760023 B1 | 10/2007 |
| RU | 2074120 C1 | 2/1997 |
| RU | 2329084 C2 | 7/2008 |
| WO | 03022745 A1 | 3/2003 |

OTHER PUBLICATIONS

Notice of Allowance issued in corresponding Russian Application No. 2017122354/05(038727), dated Apr. 25, 2018, 10 pages.

Notification of Reason for Refusal (including English translation) issued in corresponding Korean Application No. 10-2017-7018129, dated Nov. 16, 2018, 13 pages.

International Search Report (including English translation) issued in corresponding International Application No. PCT/CN2015/096259, dated Mar. 4, 2016, 6 pages.

\* cited by examiner

FILTER ELEMENT AND FILTER DEVICE

CROSS-REFERENCE TO RELATED APPLICATIONS

This application is a continuation application of PCT Application No. PCT/CN2015/096259, filed on Dec. 3, 2015, which claims the benefit of Chinese Application No. 201410729479.2 filed on Dec. 3, 2014, the contents of both of which are hereby incorporated by reference herein in their entireties.

TECHNICAL FIELD

The disclosure relates to a filter device and in particular, to a structure of a filter element in the filter device.

BACKGROUND

At present, a filter device is widely used, and in particular the water purification device has a huge market. As the development of the technology, more and more products, such as the filter devices, are produced. A filter element is the core portion in the filter device. Generally, the filter element is configured with a water inlet on one end and a water outlet on the other end to facilitate the sufficient utilization of the filter material in the filter element, and the filter element is required to be arranged transversally to enhance its stability.

SUMMARY

With respect to the problems in the prior art, an object of the disclosure is to provide a filter element and filter device which are beneficial to the entire arrangement and may reduce the space the whole device occupied.

In a first aspect, a filter element is provide to be used in a filter device. The filter element includes: a seat body mounted on the filter device and provided with a first passage and a second passage. A filter body is detachably connected to an upper portion of the seat body and including a filter space therein. The filter space includes two ends which are connected respectively through a first filter passage and a second filter passage. A filter material is provided in the filter space. When the filter element is in a working state, the first filter passage and the first passage are connected for fluid communication, and the second filter passage and the second passage are connected for fluid communication.

A filter device includes the filter element as above described.

It should be understood that the general description above and the detailed description below are merely exemplary and explanatory, and do not limit the disclosure.

BRIEF DESCRIPTION OF THE DRAWINGS

A further detailed description will be given hereinafter to the embodiments of the disclosure in conjunction with the accompany drawings, in which.

The accompanying drawings herein are incorporated into and constitute a part of this specification, and together with the embodiments of the disclosure, serve to explain principle of the present disclosure. Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein

DETAILED DESCRIPTION

Typical embodiments embodying the features and advantages of the disclosure will be described in detail in the following description. It should be understood that modifications can be made to the disclosure in different embodiments without departing from the scope of the disclosure, and the description and drawings thereof should be substantively regarded to be illustrative rather than limitative.

The advantageous effects of the disclosure are in that, as compared with the prior art, the filter element of the disclosure may receive and discharge water from the seat body on lower part, and the filter body is provided on the upper portion of the seat body to form an inverted vertical structure, such structure may save the arrangement of the pipelines since the water discharged is on the same direction as the incoming water; on the other hand, the vertical structure itself may make the overall structure of the filter element more compact, so that the filter element may occupy a smaller space and the overall arrangement is improved. Since the whole volume of the filter device using the filter element of the disclosure is greatly reduced, the market requirement is fulfilled and the product becomes more and more competitive.

An embodiment of the disclosure provides a filter device including a filter element according to the disclosure, which filter element is used in the filter device.

Figure 1:
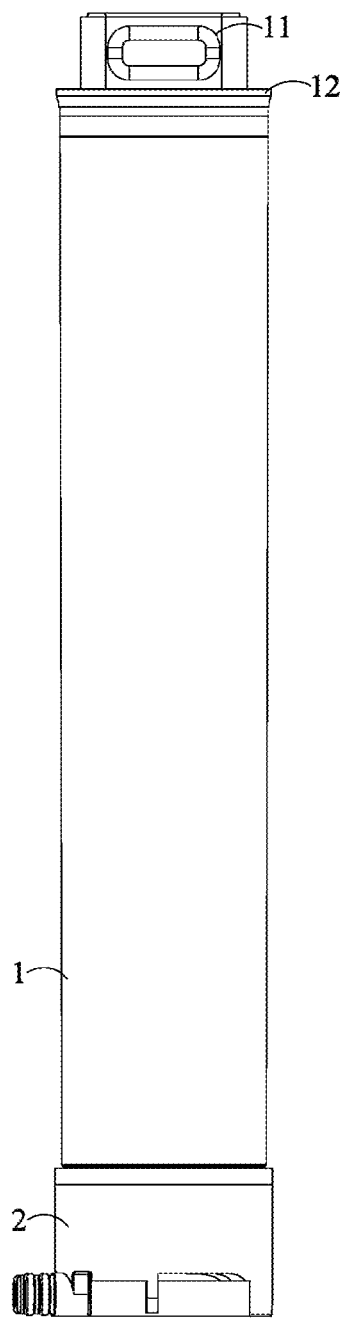
FIG. 1 is a front structural schematic view showing a filter element according to one exemplary embodiment of the disclosure.
Figure 2:
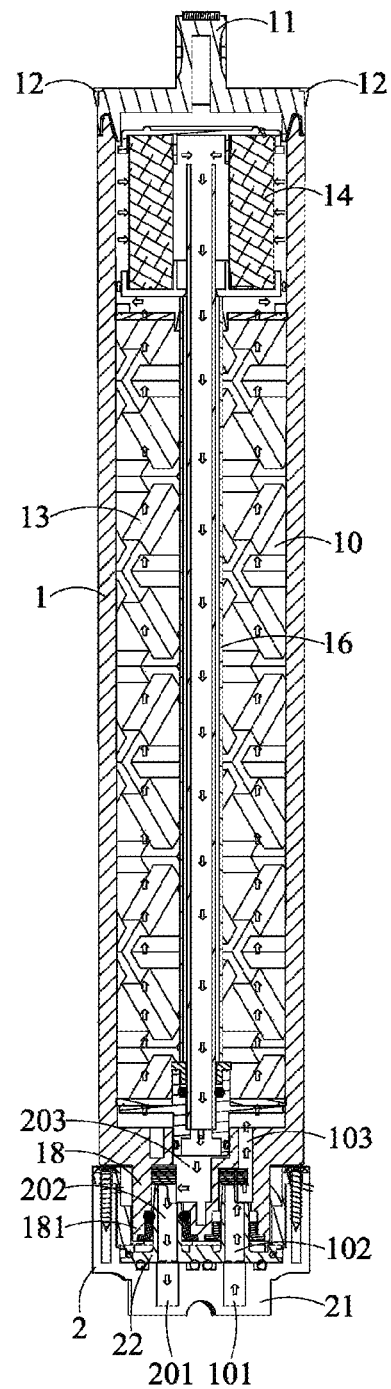
FIG. 2 is a sectional structural schematic view showing the filter element according to one exemplary embodiment of the disclosure.

The filter element according to one embodiment of the disclosure, as shown in FIGS. 1 and 2, includes a seat body 2 and a filter body 1. The seat body 2 is mounted on the filter device and is provided with a first passage 101 and a second passage 201, both of which are communicated to outside to form an intake and exit passages respectively. For example, both first passage 101 and second passage 201 are connected to an outside faucet for fluid communication. The filter body 1 is connected to an upper portion of the seat body 2, and is detachable from the seat body 2 for ease maintenance. The filter body 1 includes a filter space 10 having two ends that are connected with a first filter passage 103 and a second filter passage 203, respectively; the filter space 10 is provided with a filter material 13 to filter water or other liquid flowing through. When the filter element is in a working state, the first filter passage 103 and the first passage 101 are connected for fluid communication, and the second filter passage 203 and the second passage 201 are connected for fluid communication. In this way, water or other liquid may flow into the filter space 10 through the first passage 101 and the first filter passage 103, and is filtered by the filter material 13, and then flows away via the second filter passage 203 and the second passage 201.

The above structure of the filter element according to one or more embodiments of the disclosure may receive and discharge water from the seat body 2 on its lower portion. The filter body 1 is disposed on the upper portion of the seat body 2 and then an inverted vertical structure is formed. Such structure not only saves the arrangement of the pipelines, but also makes the whole structure of the filter element more compact. In order to optimize the filter element of the disclosure, the specific structure of this embodiment is further described, but it is not intended to limit the protection scope of the filter element of the disclosure.

Figure 3:
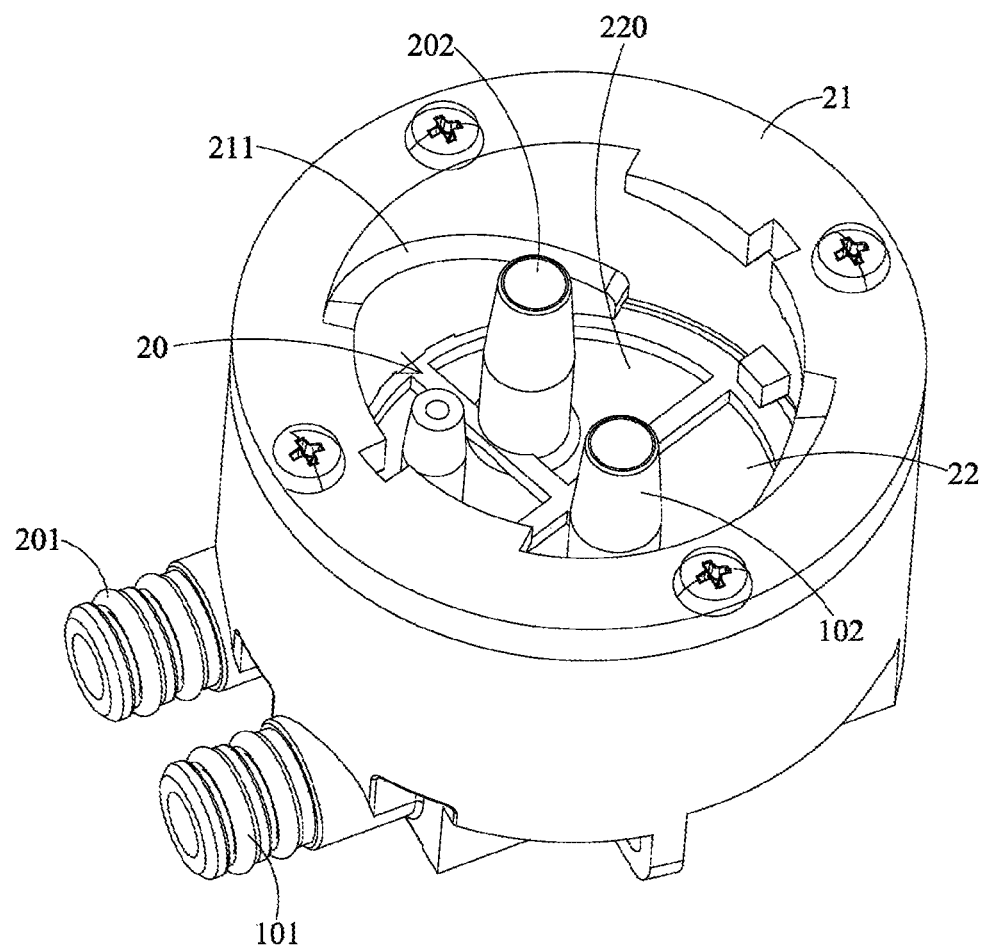
FIG. 3 is a perspective structural view showing a base in the filter element according to one exemplary embodiment of the disclosure.
Figure 4:
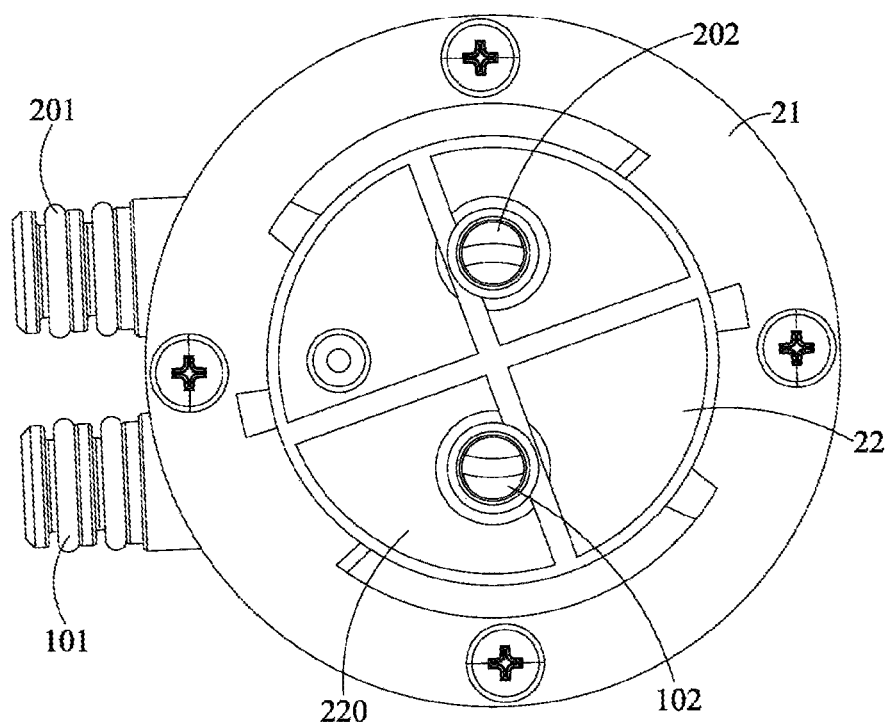
FIG. 4 is a top structural schematic view showing the seat body in the filter element according to one exemplary embodiment of the disclosure.

In an embodiment of the disclosure, the seat body 2, as shown in FIGS. 3 and 4, includes a base body 21 and a rotating body 22. The base body 21 is mounted on the filter device via a connector to support the rotating body 22. A lower portion of the base 21 is a seat block. A first passage 101 and a second passage 201 are provided on and extend out of the seat block, and are connected to the corresponding pipelines of the filter device by means of the joints. An upper portion of the base body 21 is a groove 20 which has the upper through holes of the first passage 101 and the second passage 201 provided on its bottom and an internal thread or a slope structure similar to the internal thread further provided on its inner sidewall.

Figure 7:
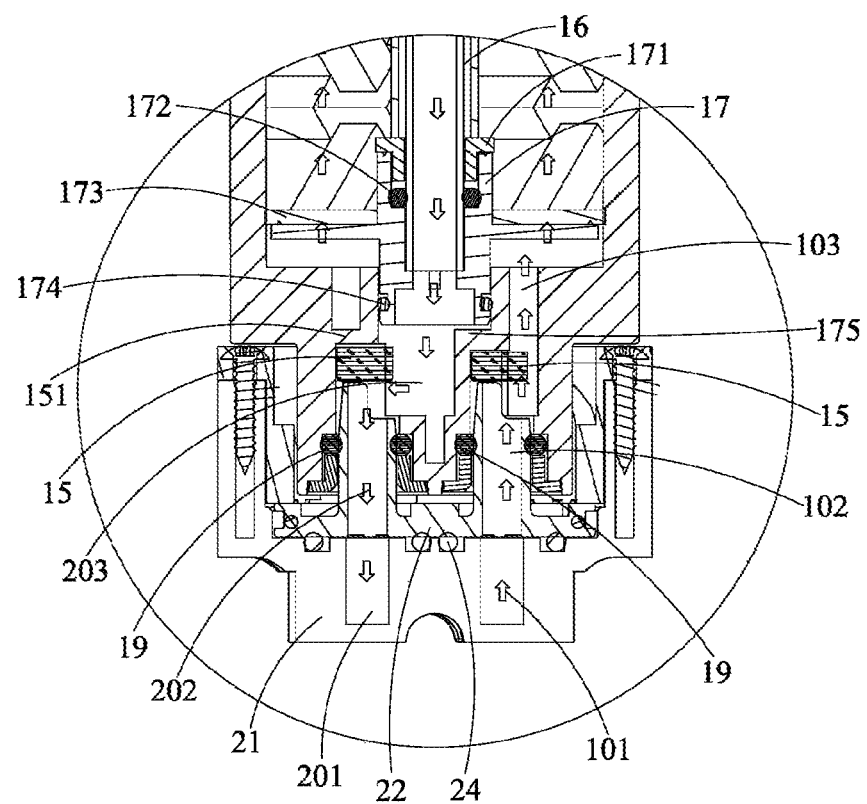
FIG. 7 is a schematic view showing the state of use of the filter element according to one exemplary embodiment of the disclosure.
Figure 8:
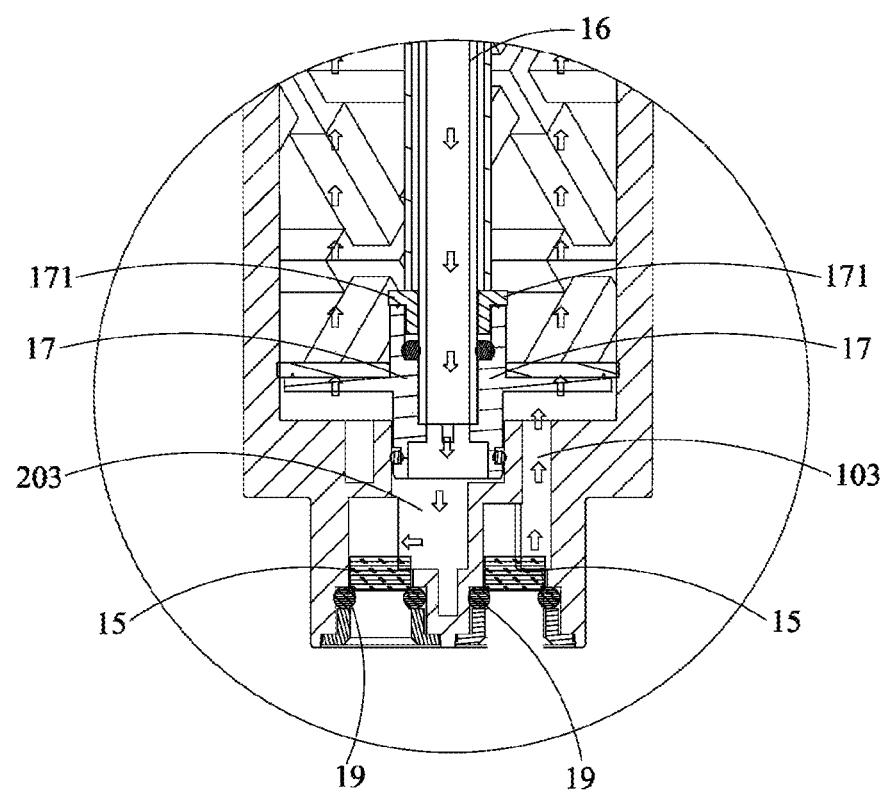
FIG. 8 is a schematic view showing a disassemble state of the filter element according to one exemplary embodiment of the disclosure.

The rotating body 22 is rotatably mounted on the base body 21, and includes a rotating plate 220, a first pipe 102, and a second pipe 202. The rotating plate 220 is a sheet structure, which has an outer edge that is adapted to the bottom surface of the groove 20 of the base body 21. A lower end surface of the rotating plate 220 abuts against the bottom surface of the groove 20, between which a seal structure 24 (as shown in FIGS. 7 and 8) may be disposed. For example, the seal structure 24 may be a seal ring, or a seal gasket, etc. An upper portion of the rotating plate 220 is pressed by the detachable fixing members with such an appropriate force that not only enable the rotation of the rotating plate 220 with respect to the base body 21 in a plane, but also ensure a reliable seal between the lower end surface of the rotating plate 220 and the bottom surface of the groove 20. The rotating plate 220 is connected to the first pipe 102 and the second pipe 202. The lower openings of the first pipe 102 and the second pipe 202 correspond to the first passage 101 and the second passage 201, respectively.

Figure 5:
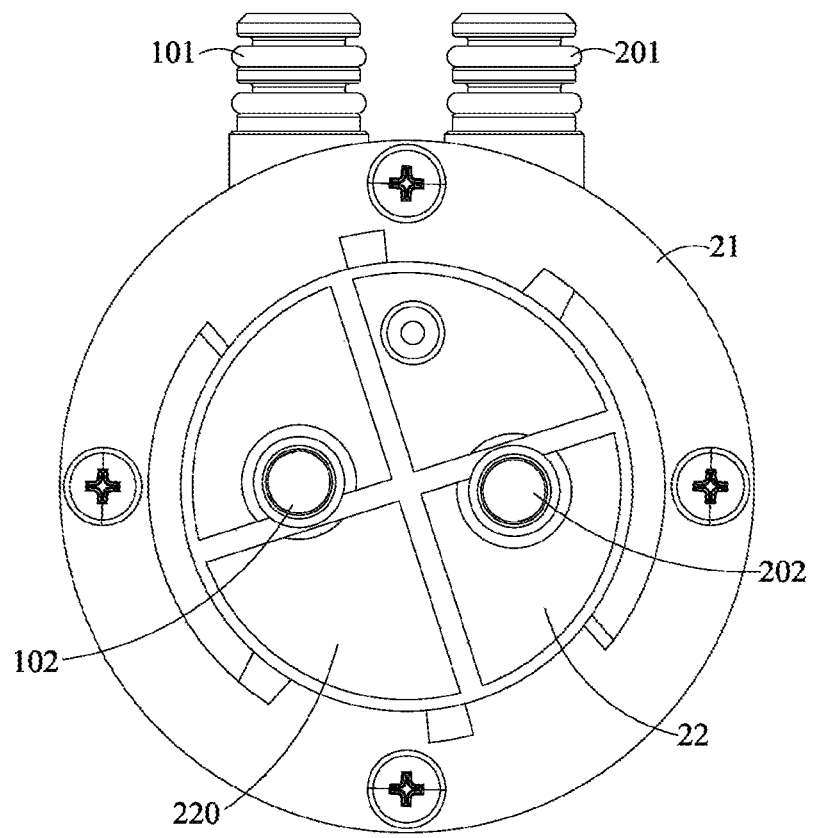
FIG. 5 is a schematic view showing a first state of the seat body in the filter element in according to one exemplary embodiment of the disclosure.
Figure 6:
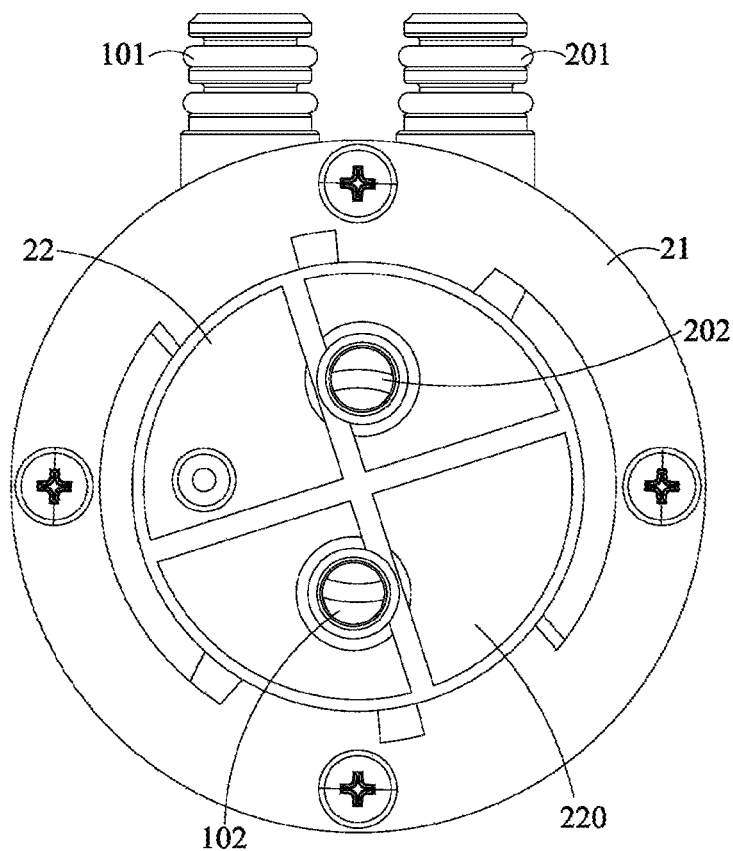
FIG. 6 is a schematic view showing the seat body of the filter element is in a second state according to one exemplary embodiment of the disclosure.

As shown in FIGS. 5 and 6, the rotating plate 220 in different positions correspond to different states of the filter element. For example, there may be two states in one or more embodiments. When the filter element is in a working state, a lower opening of the first pipe 102 is connected with the first passage 101, an upper portion of the first pipe 102 is inserted into the first filter passage 103 of the filter body 1 (as shown in FIGS. 7 and 8), and an upper opening of the first pipe 102 is connected with the first filter passage 103. At the same time, a lower opening of the filter pipe 202 is connected with the second passage 201, an upper portion of the second pipe 202 is inserted into the second filter passage 203 of the filter body 1, and an upper opening of the second pipe 202 is connected with the second filter passage 203. Herein, the first passage 101, the first pipe 102, and the first filter passage 103 are successively in fluid communication, through which the water or other liquid flows into the filter space 10. Meanwhile, the second passage 201, the second pipe 202, and the second filter passage 203 are successively in fluid communication, through which the filtered water or other liquid flows out of the filter space 10, as shown in FIGS. 5 and 7. Further, when the filter element is in the disassemble state, the rotating plate 220 rotates, the first pipe 102 on the rotating plate 220 does not correspond to the first passage 101, the second pipe 202 does not correspond to the second passage 201, the upper through holes of the first passage 101 and the second passage 201 are closed by the rotating plate, such that the intake passage of the filter body 1 is cut off, as shown in FIG. 6.

In one or more embodiments of the disclosure, as shown in FIG. 1 and FIG. 2, the filter body 1 has a cylinder shape. A handle is provided on the top of the external of the cylinder of the filter body 1 for easy manual operation. A shock absorption adhesive 12 is provided on the periphery of the top of the filter body 1 to reduce vibration and avoid damaging the filter body 1 by impact. A lower portion of the filter body 1 has a boss structure 18. The outer sidewall of which is provided with an external thread or a slope structure similar to the thread that fits to the thread (or similar to the thread) structure on the inner sidewall of the groove 20 of the base body 21. By means of the cooperation of both thread (or similar to the thread) structures, the filter body 1 may be screwed into the base body 21 to be adaptively mounted on the seat body 2, or may be screwed out of the base body 21 and disassembled from the seat body 2 quickly.

The filter body 1 is provided with a housing space therein, i.e., the filter space 10. For example, the housing space is filled with a filter material 13. The selection for the filter material 13 is associated with the function of the filter element, according to the actual situation. In one or more embodiments, the filter material includes active carbon, i.e., active carbon 13, which is able to purify the water or other fluid. Further, to avoid any problems, for example, the water becomes black, resulted from the rush away of the active carbon 13, wadding is further filled within the upper portion of the active carbon 13. In this way, the water is purified through the active carbon 13 and then through the filled wadding 14 which blocks the active carbon 13 from rushing away.

In some embodiments, the bottom of the filter space 10 is connected with the first filter passage 103, and the top of the filter space 101 is connected with the second filter passage 203. In order to prevent air from escaping and remaining in the top of the filter space 10 during the filtering, the second filter passage 203 is connected with a guide pipe 16. The guide pipe 16 is positioned in the middle of the filter space 10 and extends axially. The guide pile 16 has an upper opening that is arranged close to the top of the filter space 10, and a lower opening that is connected with the second filter passage 203. When water or other liquid which is filtered through the filter material simply flows into the guide pipe 16 through the top gap of the filter space 10, which causes such a pressure that the air cannot escape but flows into the guide pipe 16 together with water or other liquid, and is discharged from the filter body 1 through the second filter passage 203.

In one or more embodiments, as shown in FIGS. 7 and 8, in order to facilitate the filling and enclosing of the filter material 13 as well as the installation of the guide pipe 16, a bracket 17 is further provided within the filter space 10. The main body of the bracket 17 is a pallet. The periphery of the bracket 17 is adapted to the inner wall structure of the filter space. The middle portion of the bracket 17 is a hollow shaft structure within which a stepped through hole is provided. A lower portion of the guide pipe 16 is sleeved with a bushing 171 and is inserted into the stepped through hole together with the bushing 171. The lower end of the guide pipe 16 abuts against a stepped face of the stepped through hole. In order to ensure seal, a seal ring 172 is provided between the guide pipe 16 and the stepped through hole. A lower portion of the bracket 17 is mounted on an upper shoulder 175 of the second filter passage 203. The bracket 17 and the second filter passage 203 are sealed by a seal ring 174. And the pallet of the bracket 17 is provided with a gasket 173 to enclose the filter material 13 in the filter space 10. Such structure is positioned by interspersing the whole circle, to achieve coaxial foolproof and 180 degrees foolproof, so that the whole assembling of the filter element becomes simpler and more convenient.

As shown in FIGS. 7 and 8, both the first filter passage 103 and the second filter passage 203 are provided with a water-sealed shoulder 151, a seal ring 19 and a water-sealed block 15. The seal ring 19 is arranged close to the base body 21, the water-sealed block 15 is made of elastic material and positioned above the sealing ring 19, and the water-sealed shoulder 151 is positioned above the water-sealed block 15. When the filter element is in a working state, as shown in FIG. 7, the first pipe 102 and the second pipe 202 push the water-sealed block 15 against the water-sealed shoulder 151, such that the first filter passage 103 is connected with the first passage 101 through the first pipe 102, and the second filter passage 203 is connected with the second passage 201 through the second pipe 202. To ease the fluid communication between the first pipe 102 and the first filter passage 103 and to ease the fluid communication between the second pipe 202 and the second filter passage 203, the upper openings of the first pipe 102 and the second pipe 202 may be L-shaped openings, or wedge-shaped openings. When the filter element is in a disassemble state, as shown in FIG. 8, the water-sealed block 15 falls down to fit the seal ring 19, so that the lower through holes of the first filter passage 103 and the second filter passage 203 are closed. The falling of the water-sealed block 15 may be realized under the effect of its own weight, or under the effect of a return spring (not shown) that is provided between the water-sealed shoulder 151 and the water-sealed block 15.

As for an optimal water-drip proof and water-leakage proof structure of this embodiment as shown in FIG. 5, FIG. 6, FIG. 7 and FIG. 8, in a process of assembling the filter element for the first time, firstly the rotating body 22 is mounted into the base body 21, and the overall seat body 2 is mounted on the filter device by means of the connector, at this time, the rotating plate 220 closes the upper through holes of the first passage 101 and the second passage 102. Subsequently, the lower boss structure 18 of the filter body 1 is correspondingly inserted into the groove 20 of the base body 21, which causes the filter body 1 and the rotating body 22 are rotated together relative to the base body 21 due to the structural cooperation of the two threads (or similar to the threads). After rotating to the place, the first pipe 102 of the rotating body 22 is connected with the first passage 101, the second pipe 202 is connected with the second passage 201, and the upper portions of the first pipe 201 and the second pipe 202 push the water-sealed block 15 upward during the falling of filter body 1, so that the upper opening of the first pipe 102 is connected with the first filter passage 103, and the upper opening of the second pipe 202 is connected with the second filter passage 203. Herein, the water or other liquid to be filtered may flow into or out of the filter space 10 within the filter body 1 through the above passages, and can be processed by means of the filter material 13.

When the filter body 1 is disassembled, the filter body 1 is rotated, and the filter body 1 and the rotating body 22 are rotated together relative to the base body 21 due to the structural cooperation of the two threads (or similar to the threads). After rotating to the place, the rotating plate 220 of the rotating body 22 closes the through holes of the first passage 101 and the second passage 201, the upper portions of the first pipe 102 and the second pipe 202 release the water-sealed block 15 during the rising of the filter body 1. The water-sealed block 15 falls down under the effect of its own weight or the return spring, and fits the seal ring 19 to close the outer through holes of the first filter passage 103 and the second filter passage 203, so that the water or other liquid within the filter body 1 may not escape.

Further, when the filter body 1 is mounted again, the filter body 1 is simply required to screw into the seat body 2 that has been fixed, and its connection processes are as described above.

Further, the optimal water-dripped proof and water-leakage proof structure of this embodiment may also be applied to a non-inverted vertical filter element, and the other filter elements (for example, a horizontal structure) are also possible.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

The technical solutions of the disclosure have been disclosed by the embodiments as above mentioned. Those skilled in the art should be acknowledged that any variation and modification that are made without departing from the range and spirit of the present disclosure as claimed by the appended claims should be embraced by the protection scope of the claims of the disclosure.

What is claimed is:

1. A filter element used in a filter device, comprising:
a seat body mounted on the filter device, the seat body comprising a first passage, a second passage, a base body, and a rotating body, wherein the base body is mounted on the filter device, the first passage and the second passage are disposed at least partially in the base body, the rotating body is rotatably connected to an upper portion of the base body, the rotating body comprises a rotating plate with a first pipe and a second pipe provided thereon, the upper portion of the base body comprises a groove, the rotating plate is provided on a bottom of the groove, and a first thread structure is provided on an inner sidewall of the groove; and
a filter body detachably connected to an upper portion of the seat body, the filter body comprising a filter space therein, the filter space having two ends which are connected respectively through a first filter passage and a second filter passage, and a filter material being provided in the filter space, wherein a lower portion of the filter body comprises a boss structure, and a second thread structure that mates with the first thread structure is provided on an outer sidewall of the boss structure; and
wherein when the filter element is in a working state, the first filter passage and the first passage are connected for fluid communication, the second filter passage and the second passage are connected for fluid communication.

2. The filter element according to claim 1, wherein when the filter element is in the working state, a lower opening of the first pipe is connected with the first passage, an upper portion of the first pipe is inserted into the first filter passage, an upper opening of the first pipe is connected with the first filter passage, a lower opening of the second pipe is connected with the second passage, an upper portion of the second pipe is inserted into the second filter passage, and an upper opening of the second pipe is connected with the second filter passage.

3. The filter element according to claim 1, wherein when the filter element is in a disassemble state, the rotating plate closes the upper openings of the first and second passages.

4. The filter element according to claim 1, wherein a seal structure is provided between the base body and the rotating body.

5. The filter element according to claim 1, wherein both the first filter passage and the second filter passage are provided with a water-sealed shoulder, a seal ring and a water-sealed block, wherein the seal ring is arranged close to the base body, the water-sealed block is positioned above the seal ring, the water-sealed shoulder is positioned above the water-sealed block; when the filter element is in the working state, the first pipe and the second pipe push the water-sealed block against the water-sealed shoulder, such that the first filter passage is connected with the first passage through the first pipe, and the second filter passage is connected with the second passage through the second pipe; when the filter element is in a disassemble state, the water-sealed block falls down to fit the seal ring, such that lower openings of the first and second filter passages are closed.

6. The filter element according to claim 5, wherein the upper openings of the first and second pipes are L-shaped openings.

7. The filter element according to claim 5, wherein a return spring is provided between the water-sealed shoulder and the water-sealed block.

8. The filter element according to claim 5, wherein the water-sealed block is made of elastic material.

9. The filter element according to claim 1, wherein the filter material comprises active carbon.

10. The filter element according to claim 9, wherein the filter space comprises a lower portion filled with the active carbon and an upper portion filled with wadding.

11. The filter element according to claim 1, wherein, an upper portion of the second filter passage is connected with a guide pipe whose upper opening is arranged close to a top of the filter space.

12. The filter element according to claim 11, wherein the filter space is further provided therein a bracket and a stepped through hole in the bracket, the guide pipe is inserted in the stepped through hole, with a lower end of the guide pipe pressing against a stepped face of the stepped through hole; a seal ring is provided between the guide pipe and the stepped through hole, a lower portion of the bracket is mounted on an upper shoulder of the second filter passage, and the bracket and the second filter passage is sealed therebetween.

13. The filter element according to claim 1, wherein a handle for operation is provided on a top surface of the filter body.

14. The filter element according to claim 1, wherein a shock absorption adhesive is provided on a periphery of a top of the filter body.

15. A filter device, comprising:
a filter element that comprises:
a seat body mounted on the filter device and provided with a first passage, a second passage, a base body, and a rotating body, wherein the base body is mounted on the filter device, the first passage and the second passage are disposed at least partially in the base body, the rotating body is rotatably connected to an upper portion of the base body, the rotating body comprises a rotating plate with a first pipe and a second pipe provided thereon, the upper portion of the base body comprises a groove, the rotating plate is provided on a bottom of the groove, and a first thread structure is provided on an inner sidewall of the groove; and a filter body detachably connected to an upper portion of the seat body and including a filter space therein, the filter space having two ends which are connected with a first filter passage and a second filter passage, respectively, and a filter material being provided in the filter space, wherein a lower portion of the filter body comprises a boss structure, and a second thread structure that mates with the first thread structure is provided on an outer sidewall of the boss structure; and wherein when the filter element is in a working state, the first filter passage and the first passage are connected for fluid communication, the second filter passage and the second passage are connected for fluid communication.

16. The filter device according to claim 15, wherein when the filter element is in the working state, a lower opening of the first pipe is connected with the first passage, an upper portion of the first pipe is inserted into the first filter passage, an upper opening of the first pipe is connected with the first filter passage, a lower opening of the second pipe is connected with the second passage, an upper portion of the second pipe is inserted into the second filter passage, and an upper opening of the second pipe is connected with the second filter passage.

17. The filter device according to claim 15, wherein when the filter element is in a disassemble state, the rotating plate closes the upper openings of the first and second passages.

18. The filter device according to claim 15, wherein both the first filter passage and the second filter passage are provided with a water-sealed shoulder, a seal ring and a water-sealed block, wherein the seal ring is arranged close to the base body, the water-sealed block is positioned above the seal ring, the water-sealed shoulder is positioned above the water-sealed block.

19. The filter device according to claim 18, wherein when the filter element is in the working state, the first pipe and the second pipe push the water-sealed block against the water-sealed shoulder, such that the first filter passage is connected with the first passage through the first pipe, and the second filter passage is connected with the second passage through the second pipe; when the filter element is in a disassemble state, the water-sealed block falls down to fit the seal ring, such that lower openings of the first and second filter passages are closed.

20. The filter device according to claim 15, wherein a seal structure is provided between the base body and the rotating body;

wherein an upper portion of the second filter passage is connected with a guide pipe whose upper opening is arranged close to a top of the filter space; and wherein the filter space is further provided therein a bracket and a stepped through hole in the bracket, the guide pipe is inserted in the stepped through hole, with a lower end of the guide pipe pressing against a stepped face of the stepped through hole; a seal ring is provided between the guide pipe and the stepped through hole, a lower portion of the bracket is mounted on an upper shoulder of the second filter passage, and the bracket and the second filter passage is sealed therebetween.

* * * * *